United States Patent [19]

Saito et al.

[11] Patent Number: 5,145,883
[45] Date of Patent: Sep. 8, 1992

[54] METHODS FOR PRODUCING POLYETHER ESTER POLYOLS AND POLYURETHANES

[75] Inventors: Joichi Saito; Sigeyuki Kozawa; Nobuaki Kunii; Hirotsugu Yamamoto, all of Yokohama; Hiromitsu Takeyasu, Tokyo, all of Japan

[73] Assignee: Asahi Glass Company Ltd., Tokyo, Japan

[21] Appl. No.: 635,499

[22] Filed: Jan. 3, 1991

[30] Foreign Application Priority Data

May 12, 1989 [JP] Japan .................. 1-117513
May 2, 1990 [WO] PCT Int'l Appl. PCT/JP90/00579

[51] Int. Cl.$^5$ .............................. C08G 18/14
[52] U.S. Cl. .................. 521/172; 521/173; 528/76; 528/77; 528/366; 428/317.9
[58] Field of Search ............ 521/172, 173; 528/76, 528/77, 366; 428/317.9

[56] References Cited

U.S. PATENT DOCUMENTS 3,538,043 11/1970 Herold ..................... 260/40
4,902,816 2/1990 McDaniel ................. 521/172

FOREIGN PATENT DOCUMENTS 1567202 5/1969 France .
2103528 4/1972 France .

Primary Examiner—Maurice J. Welsh
Attorney, Agent, or Firm—Oblon, Spivak, McClelland, Maier & Neustadt

[57] ABSTRACT

The present invention relates a method for producing a polyether ester polyol containing polycarboxylic acid residues in the vicinity of the terminals, by means of a doubles metal cyanide complex catalyst. Namely, the present invention is a method for producing a polyether ester polyol by reacting a polyether polyol having a hydroxyl value of at most 400, a polycarboxylic anhydride and a monoepoxide by means of a double metal cyanide complex as a catalyst.

The present invention relates also to a process for producing a flexible polyurethane foam or a polyurethane elastomer using this polyether ester polyol. The flexible polyurethane foam produced has a high thermal fusing properties, and by laminating it with e.g. cloth, it is possible to obtain a laminate having high bond strength. Further, this polyurethane elastomer has superior physical properties as compared with an elastomer obtainable by using a polyether polyol or a polyester polyol.

10 Claims, No Drawings

METHODS FOR PRODUCING POLYETHER ESTER POLYOLS AND POLYURETHANES

DESCRIPTION

1. Technical Field

The present invention relates to a method for producing polyether ester polyols and a process for producing polyurethanes such as a flexible polyurethane foam excellent in the properties for thermal fusing to excellent in the mechanical properties.

2. Background Art

Conventional urethanes obtainable from polyether polyols (i.e. polyoxyalkylene polyols) have excellent characteristics with respect to various physical properties such as impact resilience, low temperature characteristics and weather resistance and economical advantages. On the other hand, they are inferior in the strength, abrasion resistance and heat resistance to polyurethanes obtainable from polyester polyols.

Accordingly, it has been desired for many years to improve the strength and heat resistance while maintaining the various physical properties of the polyether polyols and to produce at a low cost a polyurethane suitable as a casting material or as a thermoplastic urethane. However, a satisfactory polyurethane has not yet been obtained.

Heretofore, in order to overcome the above drawback, it has been proposed to employ a modified polyether polyol obtained by esterification of a usual polyether polyol, or to employ a polyol mixture obtained by mixing a polyether polyol and a specific polyester polyol. For example, Japanese Examined Patent Publication No. 28425/1971 discloses an ester-modified polyether polyol obtained by esterifying the terminals of a polyether polyol. However, this modified polyether polyol having its terminals esterified contains a substantial amount of by-products including short chain polyester components, and the physical properties such as strength and elongation of the polyurethane obtainable from such a polyol are inadequate. Further, for the purpose of improving e.g. the strength, abrasion resistance and solvent resistance of a urethane made of a polyether polyol, a method has been known in which a polyether However, a polyester polyol having a substantial interaction among the molecules is usually a highly viscous liquid or solid and thus has a problem with respect to the operation efficiency, and yet it has poor compatibility with a polyether polyol. Therefore, if the dynamic properties of the elastomer can not be improved as expected, and rather there remains a problem that the drawbacks of the two tend to appear.

Japanese Unexamined Patent Publication No. 202610/1988 discloses a method of mixing a polyester polyol having a specific structure to a polyether polyol for the purpose of improving the compatibility of the two. However, this method can not be applied to a polyester polyol having a stronger interaction among the molecules such as an aromatic polyester polyol which substantially improves the dynamic properties of the polyether polyol. Accordingly, the physical properties of the urethane obtainable from such a mixture of a polyester polyol and a polyether polyol are inadequate and must be improved.

On the other hand, conventional polyurethane foams obtainable from polyether polyols have excellent characteristics with respect to the physical properties such as the impact resiliency, the compression permanent set and the hardness, but they are substantially inferior in the thermal fusing properties and the high frequency weldability to polyurethane foams obtainable from polyester polyols. Accordingly, it has been desired for many years to produce a polyurethane foams having improved thermal fusing properties and being suitable in the field of lamination, while maintaining the foam physical properties of the polyurethane foam obtained by using a polyether polyol. However, a satisfactory polyurethane foam has not yet been obtained. A soft polyurethane foam for thermal fusion has heretofore been produced by using a polyether polyol obtained by modifying a usual polyether polyol, or by using a specific additive, in order to improve the thermal fusing properties. For example, Japanese Examined Patent Publication No. 28425/1971 discloses a modified polyether polyol obtained by esterifying the terminals of a polyether polyol. According to this method, although it is possible to obtain a polyurethane foam having good thermal fusing properties by a combination with a phosphorus compound, deterioration of the physical properties such as the impact resiliency and compression permanent set is substantial, and the merits of a polyurethane foam prepared from a usual polyether polyol are thereby lost.

Further, Japanese Examined Patent Publication No. 13880/1974 proposes to improve the thermal fusing properties by a combined use of a phosphorus compound and an urethane-modified polyether polyol obtained by reacting a polyisocyanate compound for modification. Although the foam properties such as the impact resilience of the polyurethane foam obtained by the above method may be good, no adequate thermal fusing properties have not yet been obtained. Further, Japanese Unexamined Patent Publication No. 136814/1981 disclosed e.g. a method which comprises reacting e.g. neopentyl glycol with a polyisocyanate compound in a high molecular weight polyether polyol to obtain a polyurethane solution in a high molecular weight polyether polyol. However, it is likely that turbidity or precipitation is likely to form in the polyurethane solution in a high molecular weight polyether polyol, and if it is attempted to prevent it, a substantial increase in the viscosity will be brought about. Further, even when the above polyurethane solution is employed, it is difficult to obtain a laminate foam having adequate peel strength. Further, Japanese Unexamined Patent Publication No. 162718/1982 discloses e.g. a method of using a polyurethane solution obtained by dissolving an oligourethane prepared from a dialcohol and a diisocyanate in a high molecular weight polyether polyol. However, when the urethane composition produced by the above method is subjected to a test for thermal fusing properties, not only a foam having adequate peel strength is hardly obtainable, but also internal cracks are likely to form during the preparation of the foam, whereby it is difficult to obtain a foam having excellent moldability and adequate air permeability.

Further, Japanese Unexamined Patent Publication No. 133020/1985 discloses production of a polyurethane foam by using a OH terminal urethane polymer obtainable by reacting a low molecular weight diol such as diethylene glycol to an isocyanate group-terminal urethane polymer obtainable by the reaction of a polyether polyol and a polyisocyanate compound, in combination with a specific phosphorus compound. However, by this method of using the OH terminal urethane prepolymer, it is hardly possible to obtain a foam having adequate peel strength. Further, in order to increase the peel strength, the blending amount of the above prepolymer is required to be large. Consequently, the overall viscosity of the polyol problems such that the air permeability of the foam decreases, and shrinkage of the foam after molding takes place.

In a case where a modified polyether polyol having the terminals esterified, is to be produced, it has been very difficult to conduct the synthesis by the same catalyst according to the conventional techniques. Namely, if a strong basic catalyst is used for the terminal esterification, it is unavoidable to obtain a polyol having a very wide molecular weight distribution containing short chain polyester components, because of the ester exchange reaction. Therefore, heretofore, it has been common to employ a strong base for the polymerization of the polyoxyalkylene chain and to use a weakly basic catalyst for the terminal esterification.

However, even when a weakly basic catalyst is employed, a substantial amount of by-products containing short chain polyester components, can not be avoided and constitutes a factor which substantially reduces the impact resilience, compression permanent set, etc. of the flexible polyurethane foam obtainable from such a polyol. This has been a problem which must be solved.

U.S. Pat. No. 3,538,043 discloses a method for producing a polyester by reacting a polycarboxylic anhydride and a monoepoxide by means of a double metal cyanide complex as a catalyst. However, the polyester disclosed in this U.S. Patent is an unsaturated polyester, which is not suitable as a starting material for the above mentioned polyurethanes. As a starting material for the polyurethanes, it is required to be a polyester having hydroxyl groups at the terminals. Further, it is preferred that it does not substantially have a polymerizable α,β-unsaturated group. Further, the one having a large amount of the polycarboxylic acid residues has the same problem as the above mentioned polyester polyol. Further, in order to obtain a flexible polyurethane foam having adequate thermal fusing properties, it is preferred that the polycarboxylic acid residues are present in the vicinity of the terminals of the polyether chains.

DISCLOSURE OF THE INVENTION

The object of the present invention is to solve the above mentioned problems of the prior art and to provide a method for producing a flexible polyurethane foam having good air permeability and moldability, a minimum decrease of the foam physical properties and adequate thermal fusing properties or a polyurethane elastomer having excellent physical properties and to provide a method for producing a polyether ester polyol suitable as the starting material thereof.

The present invention provides the following method for producing a polyether ester polyol and a process for producing a polyurethane using it as the starting material.

A method for producing a polyether ester polyol, characterized by reacting a polyether polyol having a hydroxyl value of at most 400, a polycarboxylic anhydride and a monoepoxide by means of a double metal cyanide complex as a catalyst.

A process for producing a flexible polyurethane foam, characterized by producing a flexible polyurethane foam by reacting polyols containing the polyether ester polyol produced by the above method and a polyisocyanate compound in the presence of a blowing agent and an assisting agent such as a catalyst.

A process for producing a polyurethane, characterized by producing a polyurethane by reacting polyols containing the polyether ester polyol produced by the above method, a chain extender and a polyisocyanate compound in the presence of an assisting agent such as a catalyst.

As mentioned above, U.S. Pat. No. 3,538,043 discloses use of a double metal cyanide complex such as cobalt zinc cyanide-glyme, as the catalyst for producing polyesters. Further, double metal cyanide complexes are known also as catalysts for producing polyethers. Such double metal cyanide complex catalysts are disclosed, for example, in the following U.S. patents and EP 283148:

U.S. Pat Nos. 3,278,457, 3,278,458, 3,278,459, 3,427,256, 3,427,334, 3,427,336, 3,829,505, 3,941,849, 4,355,188, 4,472,560, 4,721,818.

As the double metal cyanide complex catalyst in the present invention, such a double metal cyanide complex catalyst as disclosed in the above references may be used. Such a catalyst is believed to have a structure of the following formula (1).

$$M_a [M'_x(CN)_y]_b(H_2O)_c(R)_d \tag{1}$$

wherein M is Zn(II), Fe(II), Fe(III), Co(II), Ni(II), Al(III), Sr(II), Mn(II), Cr(III), Cu(II), Sn(II), Pb(II), Mo(IV), Mo(VI), W(IV) or W(VI), M' is Fe(II), Fe(III), Co(II), Co(III), Cr(II), Cr(III), Mn(II), Mn(III), Ni(II), V(IV) or V(V), R is an organic ligand, and each of a, b, x and y is a positive integer variable depending upon the valence and the coordination number of metals, and each of c and d is a positive integer variable depending upon the coordination number of metals.

In the formula (1), M is preferably Zn(II), and M' is preferably Fe(II), Fe(III), Co(II) or Co(III). The organic ligand may, for example, be a ketone, an ether, an aldehyde, an ester, an alcohol or an amide.

The monoepoxide in the present invention is a compound having one epoxy ring, such as an alkylene oxide, a glycidyl ether or a glycidyl ester. Preferred monoepoxides include ethylene oxide, propylene oxide, 1,2-butylene oxide, 2,3-buthylene oxide, styrene and other alkylene oxides. Particularly preferred is propylene oxide or butylene oxide. As the polycarboxylic anhydride, aliphatic, alicyclic or aromatic polycarboxylic anhydride, particularly a dicarboxylic anhydride, is preferred. Particularly effective for improving the thermal fusing properties of a flexible polyurethane form is an anhydride of an aromatic polycarboxylic acid. Specifically, phthalic anhydride, trimellitic anhydride, pyromellitic anhydride, methylendomethylene tetrahydrophthalic anhydride, endomethylene tetrahydrophthalic anhydride, chlorendic anhydride and maleic anhydride may, for example, be mentioned. Particularly preferred is phthalic anhydride. These monoepoxides or polycarboxylic acids may, respectively, be used in combination as a mixture of two or more different types.

In the present invention, the monoepoxide and the polycarboxylic anhydride are reacted to a polyether polyol having a hydroxyl value of at most 400. This polyether polyol preferably has from 2 to 8 hydroxyl groups, particularly from 2 to 6 hydroxyl groups, and the hydroxyl value is preferably from 10 to 400, particularly form 20 to 200. To such a polyether polyol, the monoepoxide and the polycarboxylic anhydride are reacted in the presence of the above mentioned catalyst, whereby a polyether ester polyol is obtained. The hydroxyl value of the polyether ester polyol thereby obtained is preferably from 5 to 160, particularly from 5 to 80. The number of its hydroxyl groups is preferably from 2 to 8, particularly from 2 to 6.

The amounts of the monoepoxide and the polycarboxylic anhydride relative to the above polyether polyol are not particularly limited. However, usually at least one mol of the polycarboxylic anhydride is used per mol of the polyether polyol. If the amount is less than 1 mol, a mixture of a polyether ester polyol and a polyether polyol will be formed. Preferably, at least 0.5 n mol of the polycarboxylic anhydride is used per mol of the polyether polyol having n hydroxyl groups. The upper limit of the amount of the polycarboxylic anhydride varies depending upon the molecular weight of the desired polyether ester polyol. Usually, it is suitably 5 n mol. The monoepoxide is used in an amount of at least 1 mol per mol of the polycarboxylic anhydride. Preferably, at least 1.1 mol is used per mol of the polycarboxylic anhydride. The upper limit of the amount of the monoepoxide varies depending upon the molecular weight of the desired polyether ester polyol. Usually, however, it is 20 mols per mol of the polycarboxylic anhydride. In the case of a polyether ester polyol to be used as a starting material for a flexible polyurethane foam, it is preferred that the polycarboxylic acid residues are present in the vicinity of the terminals of the molecule. Therefore, the amount of the monoepoxide is preferably at most 5 mols per mol of the polycarboxylic anhydride.

On the other hand, the fact that the hydroxyl value of the resulting polyether ester polyol is smaller than the hydroxyl value of the starting material polyether polyol, means that the polycarboxylic acid residues are present in the vicinity of the terminal of the molecule. Accordingly, in the case of a polyether ester polyol to be used as a starting material for a flexible polyurethane foam, this difference is preferably not so large. The hydroxyl value of the resulting polyether ester polyol is preferably from 1/5 to 4/5, particularly from ⅓ to ⅔, of the hydroxyl value of the starting material polyether polyol. In the case of a polyether ester polyol to be used as a starting material for other polyurethanes, the ratio is preferably from 1/10 to 5/4, particularly from 1/5 to 2/3. Further, the proportion of the polycarboxylic acid residues in the polyether ester polyol is preferably from 5 to 45% by weight, particularly from 10 to 35% by weight.

As the above polyether polyol, a polyether polyol widely used as a starting material for a polyurethane may be used. This polyether polyol is obtainable, for example, by reacting a monoepoxide such as an alkylene oxide to a polyvalent initiator such as a polyhydric alcohol, a polyhydric phenol, an amine or a polyamine. As a catalyst for reacting the monoepoxide, an alkali catalyst is employed. However, the catalyst is not limited to such a specific example. The above mentioned double metal cyanide complexes or other catalysts may be employed. Accordingly, for example, the polyether ester polyol in the present invention can be produced by preparing a polyether polyol by means of a double metal cyanide complex, followed by further reacting the polycarboxylic anhydride and the monoepoxide. The above polyether polyol is preferably a polyether polyol having, as oxyalkylene groups, oxypropylene groups only, or oxypropylene groups and oxyethylene groups in a smaller amount (preferably at most 30% by weight relative to the total of the two).

The polyols useful as starting materials for polyurethanes, include the above mentioned polyether ester polyol, and its amount is preferably from 20 to 100% by weight, particularly from 60 to 100% by weight, relative to the entire polyols. Among the above mentioned polyether polyols, those having a hydroxyl value of from 5 to 170 are preferred as other polyols. Various other polyols such as polyester polyols, polycarbonate polyols, polyoxytetramethylene polyols, polybutadiene polyols, may be incorporated. The hydroxyl value of the entire polyols is preferably from 5 to 80, particularly from 5 to 60.

In the present invention, the flexible polyurethane foam can be obtained using the above polyether ester polyol or polyols containing it as one of the main starting materials and a polyisocyanate compound as the other main starting material and reacting the two by a usual method in the presence of a blowing agent and an assisting agent such as a catalyst. As the polyisocyanate compound, various polyisocyanate compounds can be used. However, an aromatic polyisocyanate is particularly preferred. For example, tolylene diisocyanate, diphenylmethane diisocyanate, polymethylenepolyphenyl isocyanate and their modified products, or mixtures thereof, are preferred.

As the blowing agent, water or a low boiling point halogenated hydrocarbon (such as trichlorofluoromethane, dichlorofluoromethane or methylene chloride) is suitable. As the catalyst, an urethane-forming catalyst such as the above organic tin compound or the tertiary amine is suitable. For example, dibutyltin laurate, stannous octoate, triethylene diamine or N-alkylmorpholine may be mentioned. As assisting agents other than the above, various components may further be employed. For example, in many cases, a foam stabilizer is used as an essential component. For example, a silicone type foaming stabilizer such as a polyalkyl siloxane or a polyalkyl siloxane-polyoxyalkylene block copolymer may be used. Further, a flame retardant, a filler, an ultraviolet absorber, an antioxidant, a scorch preventing agent, a crosslinking agent, a thermal fusing property-improving agent, or other assisting agents may optionally be employed. The polyisocyanate compound is employed usually in an amount of from about 0.8 to 1.3 times in equivalent, particularly from about 0.9 to 1.2 times in equivalent, relative to the total amount of the modified polyol or the polyol composition (or further a compound having a functional group reactive with an isocyanate group such as crosslinking agent which can optionally be used). It is effective to employ a thermal fusing property-improving agent in order to improve the thermal fusing properties. Typical examples of the thermal fusing property-improving agent, have a functional group reactive with an isocyanate group, such as a hydroxyl group. Such organic phosphorus compounds include, for example, compounds such as phosphoric acid esters, phosphorus acid esters and pyrophosphoric acid asters. Specifically, trioctyl phosphate, triphenyl phosphate, tris(chloroethyl) phosphate, and a phosphoric acidalkylene oxide adduct, may be mentioned. When such an organic phosphorus compound is used, the amount is not particularly limited, but is preferably from about 0.01 to 5% by weight, particularly from about 0.1 to 2% by weight, relative to the polyol composition containing it. As other thermal fusing property-improving agents, thermoplastic resins may, for example, be mentioned, and by using such powders as fillers, it is possible to improve the thermal fusing properties of foams.

The flexible polyurethane foam can be produced by a method such as a one shot method, a sub-prepolymer method or a prepolymer method using the above starting materials. The one shot method is most suitable. As the molding method, a slab-molding method is suitable, but the molding method is not limited to such a specific method. The foam block thus obtained is formed into foam sheets having a suitable thickness by e.g. slice, and such sheets are usually subjected to thermal fusion with a substrate such as cloth. However, the molding method is not limited to such a method. As the method for thermal fusion, it is suitable to employ a method which comprises melting the surface of the flexible polyurethane foam by flame or hot air, and immediately laminated on the substrate for unification. The flexible polyurethane foam obtained by the present invention has high thermal fusion (peel strength), whereby an excellent laminated foam can be obtained.

In the present invention, the polyurethane such as a polyurethane elastomer can be obtained by using the above mentioned polyether ester polyol or polyols containing it and a chain extender as one of the main starting materials and a polyisocyanate compound as the other main starting material and reacting them by a usual method in the presence of an assisting agent such as a catalyst. As the polyisocyanate compound, various polyisocyanate compounds may be used. For example, an aromatic polyisocyanate, an aliphatic polyisocyanate, an alicyclic polyisocyanate and the like may be mentioned. Specifically, in addition to the above aromatic polyisocyanates, phenylene diisocyanate, 1,5-naphthylene diisocyanate, 3,3'-dichloro-4,4'-diphenylmethane diisocyanate, xylylene diisocyanate, toluylene diisocyanate, hexamethylene diisocyanate, isophorone diisocyanate, 4,4'-dicyclohexylmethane diisocyanate, bis(isocyanatemethyl)cyclohexane and their modified products and mixtures thereof are preferred.

The chain extender is a low molecular weight compound having at least two functional groups reactive with isocyanate groups. Preferably, it is a compound having a molecular weight of at most 400 and having 2 or 3 hydroxyl groups or primary or secondary amino groups. Specifically, diols such as ethylene glycol, butane diol, propylene glycol, neophetyl glycol, 1,6-hexanediol, 1,4-bis($\beta$-hydroxyethoxy)benzene, 1,4-cyclohexane diol, 1,4-cyclohexane dimethanol and xylylene glycol, and amines such as hydradine, ethylene diamine, isophorone diamine, piperadine, phenylene diamine, tolylene diamine and MOCA, may be mentioned. These compounds may be used alone or in admixture.

As a reaction method for obtaining a polyurethane elastomer, a known technique for a urethane-forming reaction is employed. For example, there are a method wherein the high molecular weight polyol, the polyisocyanate and the chain extender are mixed together, or the high molecular weight polyol and the polyisocyanate are preliminarily reacted to obtain a prepolymer having terminal isocyanate groups or terminal hydrogen groups and a chain extender or a polycyanate are mixted thereto, to obtain a casting elastomer, or to use the mixture for such a use as a coating material or an adhesive, a method wherein substantially linear thermoplastic polyurethane pellets are prepared, and they are melted under heating and formed into an elastomer product by injection molding, extrusion molding or calender processing, and a method wherein the polyurethane is dissolved in a solvent or prepared in a solvent to obtain a solution of a polyurethane elastomer, and such a solution is used as a coating agent, an impregnating agent or a draping agent for e.g. fibers. As an accelerator for the urethane-forming reaction, it is possible to employ a urethane-forming catalyst such as di-n-butyltin dilaurate, stannous octoate, triethylenediamine, triethylamine, a metal naphthenate or a metal octylate. Further, a plasticizer such as dioctyl phthalate or dibutyl phthalate, a modifier such as a process oil or a petrolium resin, a filler such as carbon black, fine silica, calcium carbonate, talc, gypsum or clay, a reinforcing agent such as carbon fibers, glass fibers, asbestos or organic fibers, an antioxidant, an age-preventing agent, a colorant, a blowing agent, a flame retardant, a coloring agent, etc. may be added as the case requires.

The urethane obtained by the present invention is useful for films, rolls, gears, solid tires, belts, hoses, tubes, vibration preventing materials, packing materials, shoe soles, fiber-treating agents, coating materials, adhesives, sealing materials, water-proofing agents, floor materials, elastic fibers etc.

Now, the present invention will be described in detail with reference to Examples. However, the present invention is' not limited to such Examples. The "parts" representing the amount means parts by weight.

EXAMPLE I AND COMPARATIVE EXAMPLE I

Preparation of polyols (polyols A and D are Comparative Examples)

The following polyols were prepared.

Polyol A: a polyoxypropylene triol having a hydroxyl value of 56 obtained by adding propylene oxide to glycerol.

Polyol B: a polyether ester triol (hydroxyl value: obtained by adding 1 part of a zinc hexacyano cobaltate catalyst, 40 parts of phthalic anhydride and 30 parts of propylene oxide to 100 parts of a polyoxypropylene triol having a hydroxyl value of 84 obtained by adding propylene to glycerol, and reacting the mixture in a pressure reactor under a nitrogen atmosphere at 120° C. for 6 hours.

Polyol C: a polyether ester tetraol (hydroxyl value: 65%) obtained by adding 1 part of a zinc hexacyano cobaltate catalyst, 40 parts of phthalic anhydride and 30 parts of propylene oxide to 100 parts of a polyoxypropylene tetraol having a hydroxyl value of 112 obtained by adding propylene oxide to pentaerythritol, and reacting the mixture in a pressure reactor under a nitrogen atmosphere at 120° C. for 6 hours.

Polyol D: a polyether ester triol (hydroxyl value: 50) obtained by adding 10 parts of triethylene amine, 40 parts of phthalic anhydride and 30 parts of propylene oxide to 100 parts of a polyoxypropylene triol having a hydroxyl value of 84 obtained by adding propylene oxide to glycerol, and reacting the mixture in a pressure reactor under a nitrogen atmosphere at 120° C. for 6 hours.

Preparation of flexible polyurethane foams

About 1.05 equivalent of TDI was mixed to a polyol mixture comprising 100 parts by weight of each of the above polyols A, B, C and D, 4.0 parts by weight of water, 0.3 part by weight of a triethylene diamine solution ("Dabuco 33LV" tradename), 1.3 parts by weight of a silicone blowing agent ("L-520" tradename, sold by Nippon Yunicar K.K.), 5.0 parts by weight of trichlorofluoromethane, 0.20 part of stannous octoate and 1 part by weight of trioctyl phosphate, and a flexible polyurethane foam was prepared by a one-shot method. The types of the polyol and the physical properties of the obtained flexible polyurethane foams are shown in Table 1 given hereinafter.

Thermal fusion test

From a block of the flexible polyurethane foam prepared as described above, a sheet having a width of 150 mm, 10 mm was cut out. The surface of this sheet was thermally melted with a flame and a nylon cloth was laminated thereon by rolls.

The laminate was left to stand for one day under a predetermined pressure. Then a test piece having a width of 25 mm was cut out, and this test piece was tested by an Instron meter to measure the peel strength.

Physical property tests

Density: in accordance with JIS-K-6767.
I.L.D: in accordance with ASTM-D-1564.
Tensile strength, elongation: in accordance with JIS-K-6767.
Permanent compression set: in accordance with JIS-K-6382.
Impact resilience: in accordance with JIS-K-6401.

TABLE 1

| | Comparative Example | | Examples | |
|---|---|---|---|---|
| | 1 | 2 | 1 | 2 |
| Type of the polyol | A | D | B | C |
| (Physical properties) | | | | |
| Density (kg/cm$^3$) | 22 | 22 | 22 | 22 |
| ILD (25%) | 11 | 12 | 12 | 10 |
| Impart resilience (%) | 40 | 28 | 35 | 38 |
| Permanent compression set (%) | 1 | −6 | 3 | 2 |
| Elongation (%) | 150 | 140 | 160 | 140 |
| Tensile strength (kg/cm$^2$) | 0.8 | 0.9 | 1.1 | 1.3 |
| Peel strength (g/25 mm) | 0 | 200 | 350 | 450 |

EXAMPLES II AND COMPARATIVE EXAMPLE II

Preparation of polyols

Polyol E: a polyether ester diol (hydroxyl value: 55) obtained by adding 1 part of a zinc hexacyano cobaltate catalyst, 42 parts of phthalic anyhdride and 142 parts by propylene oxide to 100 parts by a polyoxypropylene diol having a hydroxyl value of 160 obtained by adding propylene oxide to dipropylene glycol, and reacting the mixture in a pressure reactor under a nitrogen atmosphere at 120° C. for 6 hours.

Polyol F: a polyether ester diol (hydroxyl value: 56) obtained by adding 1 part of a zinc hexacyano cobaltate catalyst, 85 parts by phthalic anhydride and 100 parts of propylene oxide to 100 parts of a polyoxypropylene diol having a hydroxyl value of 160 obtained by adding propylene oxide to dipropylene glycol, and reacting the mixture in a pressure reactor under a nitrogen atmosphere at 120° C. for 6 hours.

Polyol G: a polyether ester triol (hydroxyl value: 66) obtained by adding 1 part of a zinc hexacyano cobaltate, 40 parts by phthalic anhydride and 60 parts of propylene oxide to 100 parts of a polyoxypropylene triol having a hydroxyl value of 129 obtained by adding propylene oxide to glycerol, and reacting the mixture in a pressure reactor under a nitrogen atmosphere at 120° C. for 6 hours.

Polyol H: a polyether ester diol (hydroxyl value: 43) obtained by adding 110 parts of phthalic anhydride, 120 parts of ethylene oxide and 50 parts of propylene oxide to 100 parts of a polyoxypropylene diol having a hydroxyl value of 160 obtained by adding propylene oxide to dipropylene glycol, and reacting the mixture in a pressure reactor under a nitrogen atmosphere at 120° C. for 6 hours.

Polyol I: a polyether ester tetraol (hydroxyl value: 80) obtained by adding 1 part of a zinc hexacyano cobaltate, 40 parts of phthalic anhydride, 40 parts of ethylene oxide and 20 parts of propylene oxide to 100 parts of a polyoxypropylene tetraol having a hydroxyl value of 160 obtained by adding propylene oxide to pentaerythritol, and reacting the mixture in a pressure reactor under a nitrogen stream at 120° C. for 6 hours.

Polyol J: a polyoxypropylene glycol having a hydroxyl value of 56 (polyol for Comparative Example)

Polyol K: a poly(1,4-butylene adipate)diol having a hydroxyl value of about 56 (N-4010, manufactured by Nippon Polyurethane K.K., a polyol for Comparative Example).

Preparation of polyurethane elastomers

To 100 parts of each of the above polyols E to K, 4,4'-diphenylmethane diisocyanate (MDI) was added in the amount as identified in the Table, and the mixture was maintained for 3 hours under stirring in a nitrogen atmosphere at 80° C. to obtain a prepolymer. Then, to the prepolymer adjusted at 60° C., 1,4-butane diol was added in an amount as identified in the Table, and defoaming was conducted under reduced pressure under stirring and reacted at 100° C. for 10 hours to obtain a sheet having a size of 30 cm × 30 cm and a thickness of 3 mm. Then, the polyurethane elastomer sheet thus obtained was left to stand for 7 days in an atmosphere having a humidity 50%. Then, various physical properties were measured. Further, the same sheet was immersed in a hot water of 85° C. for 7 days, and the strength (tensile strength) and elongation-retaining rates were measured. the results are shown in Table 2.

TABLE 2

| | Polyol | MDI[*a] | 1,4-butane diol | Tensile strength[*b] | Elongation[*b] | Tear strength[*b] | Heat aging resistance[*c] Tensile strength and elongation retaining rates | | Water aging resistance[*d] Tensile strength and elongation retaining rates | |
|---|---|---|---|---|---|---|---|---|---|---|
| Example 3 | E 100 | 35.2 | 7.7 | 412 | 720 | 53 | 78% | 92% | 61% | 84% |
| Example 4 | F 100 | 35.3 | 7.6 | 650 | 580 | 65 | 89% | 95% | 60% | 79% |
| Example 5 | G 100 | 35.8 | 7.0 | 820 | 220 | 91 | 95% | 108% | 83% | 87% |
| Example 6 | H 100 | 34.5 | 8.4 | 605 | 870 | 68 | 84% | 98% | 54% | 91% |
| Example 7 | I 100 | 36.7 | 6.2 | 780 | 160 | 116 | 92% | 114% | 87% | 99% |
| Comparative | J 100 | 35.3 | 7.6 | 305 | 830 | 56 | 28% | 41% | 63% | 85% |

TABLE 2-continued

| | Polyol | MDI[*a] | 1,4-butane diol | Tensile strength[*b] | Elongation[*b] | Tear strength[*b] | Heat aging resistance[*c] Tensile strength and elongation retaining rates | | Water aging resistance[*d] Tensile strength and elongation retaining rates | |
|---|---|---|---|---|---|---|---|---|---|---|
| Example 3 Comparative Example 4 | K 100 | 35.3 | 7.6 | 680 | 530 | 70 | 92% | 93% | 39% | 45% |

[*a]Millionate MT, manufacture by Nippon Polyurethane K.K.
[*b]In accordance with JIS-K-6301
[*c]Initial property-retaining rates after being left at 120° C. for one week in a curing oven.
[*d]Initial property-retaining rates after being left water at 80° C. for one week.

We claim:

1. A method for producing a polyether ester polyol, characterized by reacting a polyether polyol having a hydroxyl value of at most 400, a polycarboxylic anhydride and a monoepoxide by means of a double metal cyanide complex as a catalyst.

2. The method according to claim 1, wherein at least one mol, per mol of the polyether polyol, of the polycarboxylic anhydride and at least equimol, relative to the polycarboxylic anhydride, of the monoepoxide, are reacted.

3. The method according to claim 1, wherein the polyether polyol is a polyether polyol having a hydroxyl value of at most 200 obtained by ring-opening polymerization of at least one type of alkylene oxide having from 2 to 4 carbon atoms to a polyhydroxy compound having a hydroxyl value of from 2 to 8, the polycarboxylic anhydride is an anhydride of a dicarboxylic acid which does not substantially have an $\alpha,\beta$-unsaturated group, and the monoepoxide is at least one type of alkylene oxide having from 2 to 4 carbon atoms.

4. The method according to claim 1, wherein the hydroxyl value of the polyether ester polyol is from 5 to 80.

5. The method according to claim 1, wherein the hydroxyl value of the polyether ester polyol is from 5 to 80 and from 1/5 to 4/5 of the hydroxyl value of the polyether polyol.

6. The method according to claim 1, wherein the polycarboxylic anhydride is at least one polycarboxylic anhydride selected from the group consisting of phthalic anhydride, trimellitic anhydride, pyromellitic anhydride, methylendo methylene tetrahydrophthalic anhydride, succinic anhydride and glutaric anhydride.

7. A process for producing a flexible polyurethane foam, characterized by producing a flexible polyurethane foam by reacting polyols containing the polyether ester polyol produced by the method as defined in claim 1 and a polyisocyanate compound in the presence of a blowing agent and an assisting agent such as a catalyst.

8. A laminate obtained by thermally fusing the flexible polyurethane foam produced by the process as defined in claim 7 and a fibrous substrate.

9. A process for producing a polyurethane, characterized by producing a polyurethane by reacting polyols containing the polyether ester polyol produced by the method as defined in claim 1, a chain extender and a polyisocyanate compound in the presence of an assisting agent such as a catalyst.

10. The process according to claim 9, wherein the chain extender is a compound having a molecular weight of at most 400 and having 2 or 3 functional groups reactive with isocyanate groups.

* * * * *